July 7, 1959   H. W. BOYLAN ET AL   2,893,700
HEATING, VENTILATING AND AIR CONDITIONING SYSTEMS FOR VEHICLES
Filed Sept. 21, 1955   3 Sheets-Sheet 3
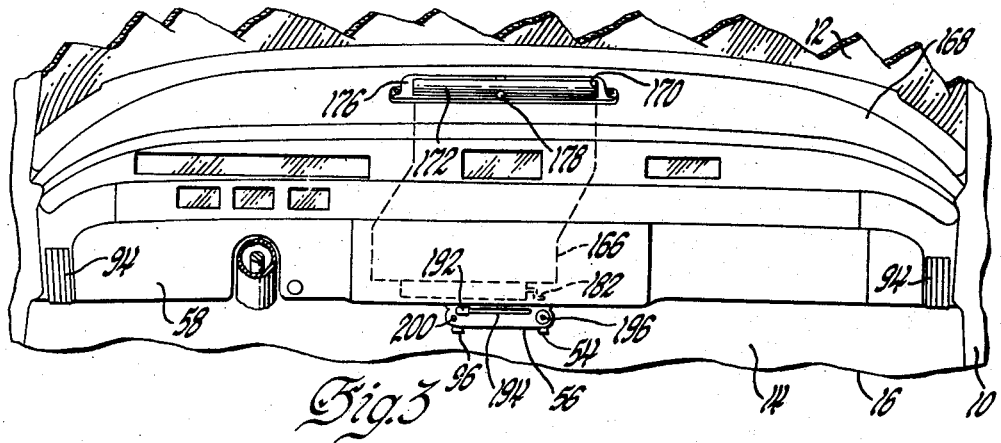
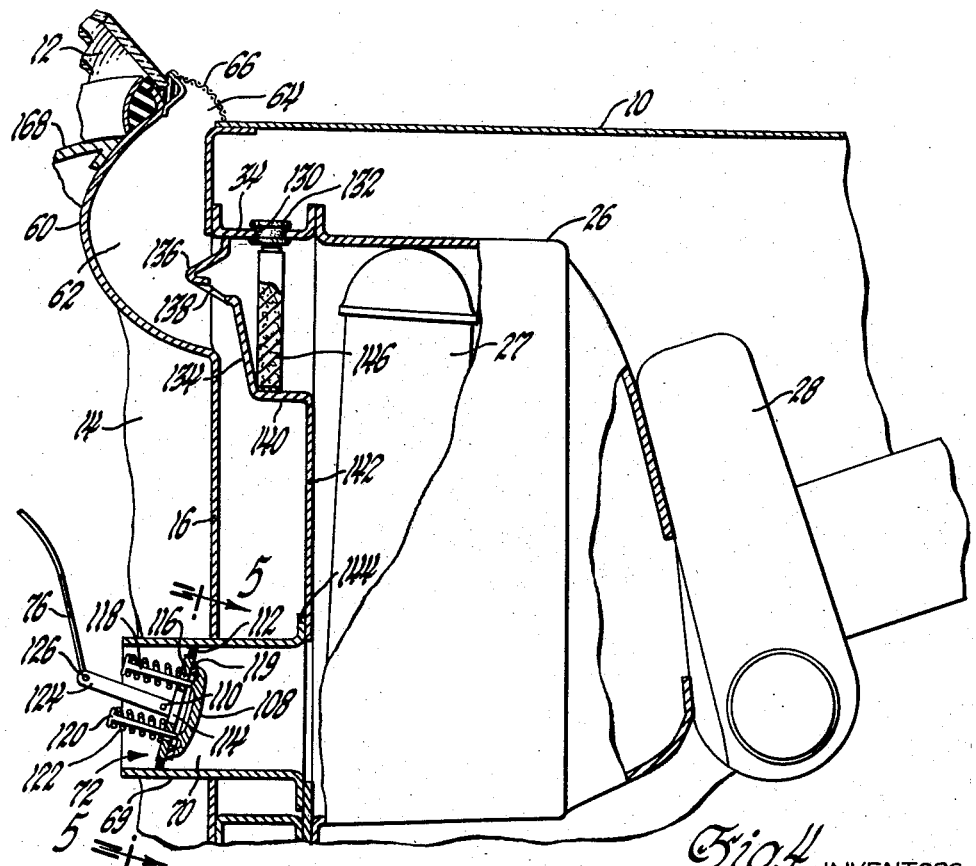
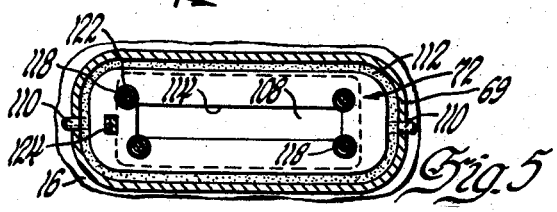
INVENTORS
Henry W. Boylan,
Harry C. Doane &
Orman E. McManama
BY J. W. Lovett
ATTORNEY United States Patent Office
2,893,700
Patented July 7, 1959

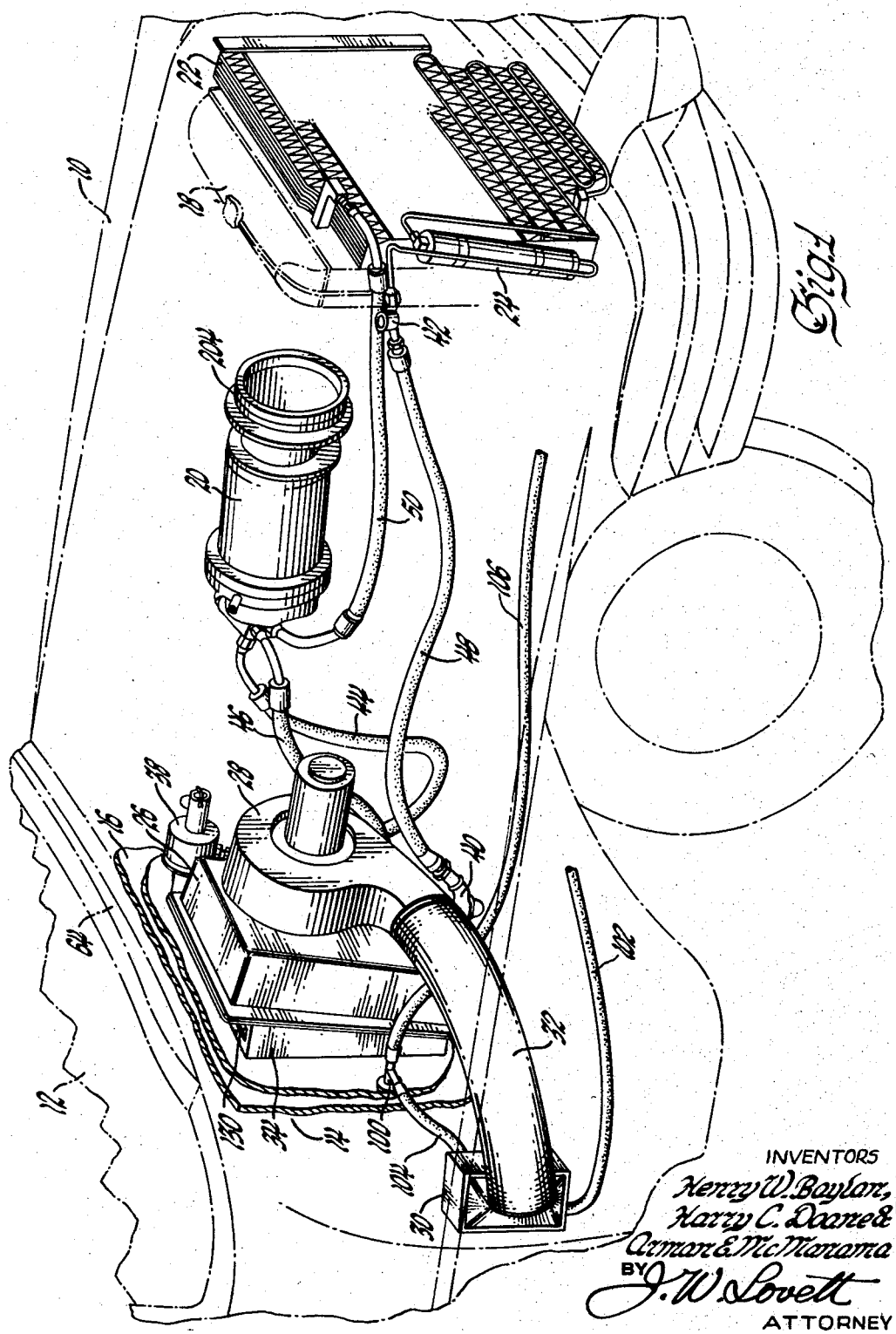

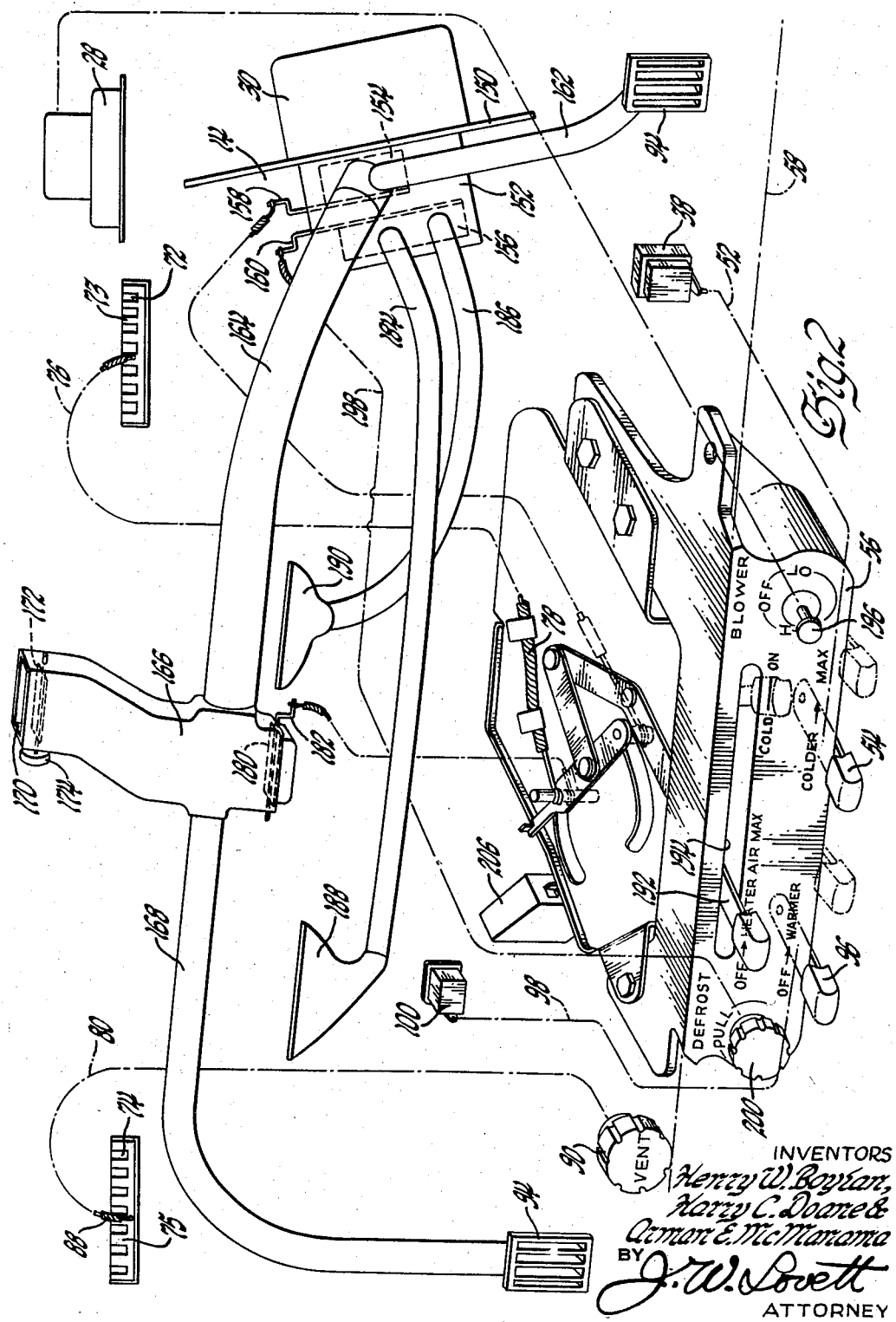

2,893,700

HEATING, VENTILATING AND AIR CONDITIONING SYSTEMS FOR VEHICLES

Henry W. Boylan, Harry C. Doane, and Arman E. McManama, Flint, Mich., assignors to General Motors Corporation, Detroit, Mich., a corporation of Delaware Application September 21, 1955, Serial No. 535,611

1 Claim. (Cl. 257—7)

This invention relates to heating, ventilating and air conditioning systems and more particularly to such systems as installed in the forward portions of automotive vehicle bodies for enhancing the comfort of passengers therein.

An excellent system for heating and ventilating an automotive vehicle has been disclosed in the United States Patent No. 2,800,285, issued July 23, 1957, in the names of Muller and Bayley and entitled "Heating, Ventilating and Defrosting Systems." That system employs an outside air inlet at the base of the windshield communicating with ducts arranged forwardly of the fire wall and leading rearwardly to the passenger compartment. Subsequent systems were developed in each of which an air conditioning system was added in such a way that the same conduits are used for both heating and cooling the air. Such systems are disclosed in the United States applications for Letters Patent Serial No. 526,872, filed August 8, 1955, in the names of Boylan, Doane and Muller and entitled "Systems for Modifying Heat Content of Air Introduced Into Vehicles," and Serial No. 478,958, filed December 31, 1954, in the name of Maurice A. Thorne and entitled "Air Heating and Cooling Apparatus for Vehicles."

While the systems above referred to operated very satisfactorily, it was found through use at some vehicle speeds particularly that the control of the heating and cooling was not as simple, positive, or effective as would be desirable. Also, back seat heating, prior to the present invention, has required underseat heaters in order to eliminate unheated zones and objectionable drafts but lower cars and dual exhausts have made it increasingly difficult to find room for underseat heaters with all their necessary connections. The adequate heating of rear seat passengers without using an underseat heater has been a difficult problem. Heretofore another problem has also been pre-eminent and that is that many cars are originally equipped and designed for use with heating and ventilating facilities and without air conditioning or refrigeration. To add an air conditioning system to such a car has heretofore required considerable redesigning of the car. It would be well if such systems could be added or omitted without entailing costly and extensive changes in equipment or necessitating special tools and skilled workers for installation and service. In addition, it would save much time, effort and expense if air conditioning systems could be added to cars as elements all connected together and fully charged with coolant rather than adding such systems piece by piece as in previous years. Also, with an increase in vehicle speed, the ram effect of air has often been too high to secure proper controlled cooling by an air conditioning system. It has, therefore, been necessary to restrict the air flow to the air conditioning system evaporator. This restriction has had an adverse effect on the associated heating system when the evaporator core and heater core are arranged in series in that insufficient air is supplied for heating and this situation obtains particularly when the heating core is large to assume a capacity partially and normally assumed by an underseat heater.

An object of the present invention is to provide an improved heating, ventilating and air conditioning system in an automotive vehicle.

Another object is to provide a combined air conditioning and heating system in a vehicle in which air in adequate quantity may be modified as to heat content regardless of whether the operation of the moment is heating or cooling of the air in the passenger compartment or whether the vehicle is stationary or moving at high or low speed.

Another object is to provide a vehicle air conditioning, ventilating and heating system adaptable for service under all weather conditions with adequate air flow being automatically assured for either heating or cooling to such an extent that an underseat heater is not required for proper heating of the compartment served by the system.

Another object is to provide a vehicle air conditioning, ventilating and heating system with elements controlling the air flow or distribution to the passenger compartment and operable in a predetermined sequence for either heating or cooling by means of a single control device.

Still another object of the invention is to provide a single system for cooling or heating air in a vehicle to which system the cooling apparatus components form a precharged unit thereby eliminating the need of special tools and skilled handling for installation and maintenance.

To these ends, a feature of the invention resides in duct means including two heat exchangers and a blower arranged in series to conduct outside air to the passenger compartment of a vehicle in combination with a pressure regulator means arranged to be actuated by the blower to recirculate supplementary air from the passenger compartment to the duct means. Another feature is the combination of a single control means for actuating the elements effecting the distribution of heated or cooled air in a vehicle air conditioning system. Another feature is a pressure actuated relief valve arranged to supplement the air supply for a duct including an evaporator and a heater core with air recirculated from the passenger compartment of an automotive vehicle.

These and other important features of the invention will now be described in detail in the specification and then pointed out more particularly in the appended claim.

In the drawings:

Fig. 1 is a perspective and phantom view of the front end of an automotive vehicle in which a heating, ventilating and air conditioning system embodying the present invention is installed;

Fig. 2 is a perspective and diagrammatic view of a sub-panel adapted to be attached to a vehicle main instrument panel and showing the controls, conduits, valves, etc., used in operating the basic elements of the system shown in Fig. 1;

Fig. 3 is a view in elevation of the main instrument panel and associated parts used on the vehicle shown in Fig. 1 with the sub-panel of Fig. 2 in place;

Fig. 4 is a sectional view taken through the cowl of the vehicle in Fig. 1 and somewhat diagrammatically showing the evaporator and filter casing in section; and Fig. 5 is a sectional view taken along the line 5—5 in Fig. 4.

In the drawings, the front end of an automotive vehicle 10 is shown having a windshield 12, a passenger compartment 14, a fire wall 16 and an engine radiator 18. To this vehicle has been added the major elements of a heating, ventilating and air conditioning arrangement, these elements being a compressor 20 adapted to be belt driven from the crankshaft on the engine, a condenser 22, a coolant receiver 24, an evaporator casing 26 with a core 27, a blower 28, and a heater core casing 30. The blower 28 has its inlet in communication with the evaporator casing 26 and its outlet connected to the heater casing 30 by means of a conduit 32.

In the arrangement of Figs. 1 and 4, an adaptor or filter housing 34 is interposed between the rear side evaporator casing 26 and the fire wall 16. The blower 28, casing 26 and housing 34 are suitably joined together and fixed to the fire wall 16 in a rigid manner by means not disclosed.

A hot gas by-pass valve 38, an expansion valve 40 and a sight gauge 42 are suitably connected in the air conditioning system by proper fittings and flexible conduits 44, 46, 48 and 50 to control the coolant flow. The by-pass valve 38 is adapted to automatically control the minimum pressure within the evaporator core 34. A pilot valve in the valve 38 may be set in various control positions by means of a Bowden wire 52 (Fig. 2) connected to a lever 54 pivoted to a sub-panel 56 attached below the main instrument panel 58 within convenient reach of a vehicle passenger or operator. As the means for controlling the circulation of the coolant through the air conditioning system involving the by-pass valve 38 is not a part of the present invention and as other means may be employed for controlling the coolant flow without departing from the present invention, further description regarding this aspect is not included herein. Incidentally, however, a suitable control of coolant by means of a hot gas by-pass valve is described in the United States application Serial No. 465,094, filed October 29, 1954, now Patent No. 2,774,219 in the name of Curtis P. Kelley and entitled "Refrigerating Apparatus." Another suitable hot gas by-pass arrangement is disclosed in the United States application Serial No. 570,201, filed March 7, 1956, in the names of Holmes, Mandy and Taylor and entitled "Air Conditioning Systems."

The automobile body 10 is provided with a primary duct means 60 as best seen in Fig. 4. This duct means cooperates with the fire wall 16 to define an outside air receiving chamber 62 having an inlet 64 just forward of the windshield 12 and extending substantially the width thereof. The inlet is provided with a screen 66 to prevent the entrance of foreign objects and to present a pleasing appearance.

As in the Patent No. 2,800,285, and the application Serial No. 526,872, heretofore referred to, the automobile 10 has two blisters located forward of the fire wall with their upper portions communicating with the chamber 62. In the instant disclosure the adaptor housing 34 and the evaporator casing 26 are substituted for the right-hand blister. The left-hand blister is not shown in the present drawings but it will be appreciated that it communicates with the passenger compartment 14 with the flow of ventilation air only being under the control of a pivoted valve 74 (Fig. 2). The right-hand arrangement of adaptor housing and evaporator core casing communicates with the passenger compartment by means of a conduit 69 (Fig. 4) defining a port 70 of rectangular and elongated cross-section leading to the passenger compartment 14. This port is controlled by a pivoted valve 72 (Fig. 5). The valve 72 may be manually actuated by a Bowden wire 76 guided by a conduit 78 (Fig. 2) and leading to a control apparatus mounted on the sub-panel 56. The valve 74 controlling air flow from the left-hand blister may be opened or closed by means of a Bowden wire 80 guided by a conduit 88 and actuated by a knob 90 extending from the main instrument panel 58. Preferably the valves 72 and 74 are concealed from view by grills 73 and 75 respectively.

The sub-panel 56 and the controls thereon do not form a part of the present invention but they are described herein only to the extent necessary to make operation of the system clear. The sub-panel and the controls supported thereon and associated therewith are disclosed in the United States application for Letters Patent Serial No. 534,841, filed September 16, 1955, in the names of Boylan and Doane and entitled "Unitary Mechanisms for Sequential Control."

At each end of the main instrument panel 58 is mounted an outlet device 94 for mixing treated air being directed into the passenger compartment 14. Numerous other forms of outlets could be employed in practicing the present invention but the outlet device 94 as herein referred to is disclosed in the application for United States Letters Patent Serial No. 534,012, filed September 13, 1955, in the name of Henry W. Boylan and entitled "Universal Air Deflector Outlet Devices."

A second lever 96 is pivoted on the sub-panel 56 and is connected by means of a Bowden wire 98 to a temperature regulating valve 100 mounted on the fire wall 16 and adapted to control the temperature of the heater core in the heater casing 30. It will be appreciated that the heater core is connected to the coolant system of the engine by means of hose connections 102, 104 and 106 which form a circulatory system including the valve 100. Valves such as valve 100 are of conventional construction and may be purchased on the market.

The valve 74 is a plain butterfly type valve employed only for the control of ventilation air to be admitted from the left-hand blister into the passenger compartment. Such a plain valve would be substituted for the valve 72 at the right-hand blister when the air conditioner elements are omitted. With regard to the right-hand valve 72 in an air conditioner installation as depicted in the drawings, however, a secondary pressure actuated valve 108 is involved. Details thereof are shown in Figs. 4 and 5. The main valve 72 for air conditioning comprises a plate having trunnions 110 journaled in the opposite sides of the conduit 69. The valve 72 bears a peripheral rubber strip 112 which is adapted to engage the inner surface of the conduit 69 in fluid tight relation when the valve 72 is pivoted on the trunnions 110 to its closed position as illustrated in Fig. 4. The valve 72 bears a rectangular central opening 114 and around the latter are four smaller openings 116 which slidably receive four rods 118. These rods are attached to the pressure actuated valve 108 and are provided with heads 120. A conical spring 122 is retained around each of the rods 118 and acts against a head 120 resiliently to urge the valve 108 into its closed position on the valve 72. A rubber member 119 is fixed to the valve 72 and interposed between the margins of the valve 108 and the valve plate to constitute a valve seat. An arm 124 is fixed to the valve 72 near one of the trunnions 110 and the end of the arm is connected as at 126 to the operating member 76.

The adaptor or filter housing 34 is provided with an opening 130 in its top for the reception of a rubber closure strip 132. The top of the housing 34 is also provided with a rearwardly facing wall 134. This wall includes a V-formation 136 which extends into the chamber 62 a slight distance and the downwardly facing wall portion of the V-formation is apertured as at 138 to form an elongated air metering opening extending in the plane of the fire wall 16. The lower extremity of the wall 134 joins with a horizontal wall portion 140 which is integral with the forward wall 142 of the housing 34. The forward extending flange 144 of the conduit 69 is also joined to the wall 142. A filter element 146 is supported within the housing 34 with its base or one edge on the horizontal wall 140 and the rubber strip 132 engages the top of the filter element so that all air entering the opening 138 must pass through the filter element.

In the vehicle 10 the forward portion of the passenger compartment 14 is provided with a vertical right-hand side panel 150 (Fig. 2) extending upwardly from the toe-board and the heater core casing 30 communicates through this panel to a distributor housing 152 located in the passenger compartment as is the case in the Patent No. 2,800,285, heretofore referred to. In the instant development, however, the heater core is much larger making it possible to dispense with the usual underseat heater. It is to be noted, however, that a mere increase in the size of the heater will not serve this purpose but other additional expedients as herein disclosed should be utilized in order to gain the proper uniform heating of the entire passenger compartment.

The structure of the air distributing manifold 152 is not disclosed herein in detail as many variations thereof may be utilized. It may be stated, however, that the manifold is provided with two valves 154 and 156. These valves are operated from closed to open position or vice versa by means of cranks 158 and 160, respectively. The valve 154 controls the discharge of air into two conduits 162 and 164. The conduit 162 communicates at its other end with the outlet device 94 at the right-hand end of the instrument panel 58. The conduit 164 communicates with a central housing 166 and through that with a conduit 168 which leads to the outlet device 94 at the left-hand end of the instrument panel. The upper end of the central housing 166 extends through the shelf-like portion 168 of the instrument panel to terminate in an opening 170 controlled by an elongated shutter-like valve 172. In Fig. 2, the valve is diagrammatically illustrated as operable by means of a wheel 174. In Fig. 3, the valve 172 is presented in the form of an arcuate and elongated element pivoted in a cast fixture 176 and operable by a knob 178. This outlet and valve structure may be provided in various forms for use in employing the present invention.

The lower end of the housing 166 is provided with a downwardly extended opening controlled by a valve 180. This valve is provided with a crank member 182.

As stated heretofore, the manifold 152 is provided with a second valve 156. This valve is arranged to control the flow of air from the manifold 152 into two conduits 184 and 186. These conduits are connected to V-shaped defroster air outlets 188 and 190 respectively. These outlets are mounted to the rear and at the base of the windshield 12 as is customary.

The sub-panel 56 and the controls thereon are described in the United States application S.N. 534,841, as heretofore referred to, but it suffices herein to state that the valves 72, 180 and 154 are operated by Bowden wires actuated by a single lever 192 movable within a slot 194. The blower 28 is actuated by a switch controlled by a button 196 protruding from the right-hand end of the sub-panel 56. The defroster valve 156 is actuated by its crank 160 which in turn is operated by a Bowden wire 198 fixed to a knob 200 protruding from the left-hand end of the sub-panel.

The compressor 20 is operated through a magnetic clutch 204 belt driven from the engine crankshaft and energized by closure of a switch fixed to the sub-panel 56.

With the apparatus arranged as disclosed in the drawings and assuming that the air conditioning system is in operation, outside air will enter through the opening 64 into the chamber 62. Valve 74 will be placed in its closed position by use of the knob 90. The valve 72 will be in its open position and the compressor switch 206 will be closed by proper actuation of the arm 192. Under such circumstances the core 27 will be cooled by the flow of refrigerant discharged by the expansion valve 40 and the flow of heating fluid through the heater core will be cut off. Air flowing through the chamber 62 will be restricted by the metering opening or orifice 138 and the required amount of outside air to be cooled will be filtered by the filter 146 and mixed with supplemental air admitted by the open valve 72. This mixture is passed through the core 27 and forced by the blower 28 through the dormant heater core into the manifold 152. With proper positioning of the lever 192, air will be distributed from the required openings of devices 94 and the housing 166. Any moisture entering the chamber 62 will not pass through the orifice 138 but will flow down and around the conduit 69 for ultimate discharge through drain hoses not shown.

Assuming that a heating effect is desired and air conditioner elements are installed, then the controls are so placed that the core 27 is dormant, i.e. the switch 206 is open and the compressor 20 is not operating and heat from the engine is being imparted to the core in the heater under the control of the valve 100. In such a case outside air is again admitted from the chamber 62 and into the housing 26 by way of the opening 138 and the filter 146. This air is not sufficient, however, when the heating system is in operation and the valve 72 is closed, particularly when an underseat heater is not provided and the heater 30 is of large capacity. To supply the deficiency during heating, the pressure actuated valve 108 comes into operation. The blower 28, in an attempt to supply the required amount of air, will cause a drop in pressure within the housing 26. This will cause the valve 108 to open against the springs 122 and air from the passenger compartment 14 will be recirculated through the heating system by way of the opening 114 in the closed valve 72 while being mixed with outside air. In this way the heating and cooling systems are in series forming a single conduit arrangement but the heating system places no difficulty in the way of the operation of the cooling system and vice versa.

If an automobile were to be produced without the air conditioning system, all that need be done is to substitute a plain valve 74 for the special valve 72 and the adaptor housing 34 as well as the evaporator housing 26 may be eliminated utilizing a simple blister similar to the lefthand blister for ventilation purposes in combination with a blower mounted thereon. Such blisters and blower arrangements are like those disclosed in the United States Patent No. 2,800,285 heretofore referred to.

There are a number of outstanding characteristics of the present disclosed arrangement. For example, it is to be noted that there will be no recirculated air from the passenger compartment for heating when the air conditioner elements are not installed, unless the substituted valve 74 (for right blister) is manually opened and the car is standing still or operating at very low speeds. At normal operating speeds of the vehicle the air flow through the passage 62 would be greater than the capacity of the blower and air would by-pass the blower and dump directly into the passenger compartment 14 through the passage 70. With substituted valve 74 normally closed, outside air is drawn in through the cowl vent or opening 64 and is passed by the blower 28 through the heater core for distribution as determined by the amount of opening of the two control valves 154 and 156 in the manifold housing 152. Another characteristic is outstanding and that is that, with or without the air conditioning being installed, the heating system is fully available for use in hot weather to bring about forced ventilation. In such weather the valves 72 and 74 may be opened and the blower 28 may be availed of to bring about the ventilation.

The arrangement of the air outlets is such that the air is discharged into the passenger compartment with a mixing action rather than with a high velocity of air into one or two predetermined zones as utilized heretofore. This mixing action is not only attributed to the grill and universal adjustment character of the outlet devices 94, but also to the arrangement or specific placement and the number of outlets provided.

The cooling system components are so arranged that they may easily be installed in an automobile, it having been found that the evaporator assembly including the housing 26, the core 27 with its casing, the control valves 40 and 38 and the filter or adaptor casing 34, all connected and precharged, is so low in weight that one man can easily attach it in place. The coolant side of the refrigeration system is such as to be capable of installation as a single unit thereby eliminating the extreme care heretofore required in maintaining cleanliness and preventing damage to the connecting parts. The installation does not require trained refrigeration mechanics or special tools.

At high vehicle speeds the capacity of the system for either heating or cooling is adequate under all conditions of weather which may be encountered. It is to be noted that when the air is being cooled by the evaporator, the valve 72 should be open. Assuming that a vehicle is operating at a speed of 100 miles per hour, it has been found that the percentage of outside air is effectively controlled or metered by the opening 138 so that at that speed of the vehicle about 60 percent of the air passing through the evaporator is outside air. When the vehicle is at rest and the engine is idling with the evaporator or refrigeration system in operation, about 25 percent of the total circulated air passed through the blower is outside air. During heating it is to be noted that the spring loaded or pressure actuated valve 108 prevents cold air from entering the vehicle when the blower 28 is turned off. When the blower is turned on the valve permits air to recirculate and maintain the rate of air flow required for heating.

The combination of the single or unitary control means of Fig. 2 in the instant heating and air conditioning system makes possible, regardless of fluctuation in weather, an ease and degree in adjusting the air conditions in the passenger compartment not heretofore realized.

We claim:

An air conditioning and heating system for an automotive body having a windshield, fire wall, engine compartment and a passenger compartment, said system including primary duct means extending downwardly from forward of the windshield base and then forwardly toward said engine compartment for receiving outside air by ram effect or blower suction, secondary duct means including an evaporator core and a heater core arranged in series with a multi-speed blower, a metering port connecting said primary duct means to one end of said secondary duct means for admitting outside air to said evaporator and heater cores in quantity adequate in use for cooling by said evaporator core when supplemented by recirculated air but insufficient for use in heating by said heater core, the other end of said secondary duct means communicating with said passenger compartment for discharging cooled or heated air into the latter, an intermediate portion of said secondary duct means having a recirculation air inlet port leading from said passenger compartment and adapted to supply recirculated air to said cores, valve means arranged to control the flow of air through said recirculation air inlet port for either heating or cooling, said valve means including a valve spring loaded to seat against the pressure of air in said passenger compartment with low speed operation of said blower and to open with higher speed operation of the blower when said heater core effects heating of the air.

References Cited in the file of this patent
UNITED STATES PATENTS

| | | |
|---|---|---|
| 1,990,753 | Rapp | Feb. 12, 1935 |
| 2,264,848 | Kahl | Dec. 2, 1941 |
| 2,647,451 | Aufiero | Aug. 4, 1953 |
| 2,682,883 | Phillips | July 6, 1954 |
| 2,735,657 | Owen | Feb. 21, 1956 |
| 2,789,794 | Moore et al. | Apr. 23, 1957 |